United States Patent
Schulz, Jr.

[15] 3,673,617
[45] July 4, 1972

[54] INTEGRAL TOPS AND BOWLS FOR SINKS AND THE LIKE AND METHODS OF MAKING THE SAME

[72] Inventor: Robert D. Schulz, Jr., 1386 Cardial Drive, Pittsburgh, Pa. 15243

[22] Filed: Sept. 16, 1969

[21] Appl. No.: 858,369

[52] U.S. Cl. ............................................................ 4/187
[51] Int. Cl. ........................................................ E03c 1/18
[58] Field of Search ................. 4/187, 166, 173; 264/71, 45

[56] References Cited

UNITED STATES PATENTS

| | | | |
|---|---|---|---|
| 3,045,254 | 7/1962 | Cook et al. | 4/173 |
| 3,120,570 | 2/1964 | Kennedy et al. | 264/45 |
| 3,220,902 | 11/1965 | Edwards | 156/79 |
| 3,231,439 | 1/1966 | Voelker | 156/79 |
| 3,255,061 | 6/1966 | Dobbs | 156/79 |
| 3,391,823 | 7/1968 | Tijms | 220/83 |
| 3,433,860 | 3/1969 | Ruggles et al. | 264/71 |

FOREIGN PATENTS OR APPLICATIONS

| | | | |
|---|---|---|---|
| 1,212,667 | 10/1959 | France | 187/ |
| 1,227,969 | 3/1960 | France | 4/173 |

Primary Examiner—Laverne D. Geiger
Assistant Examiner—Donald B. Massenberg
Attorney—Buell, Blenko & Ziesenheim

[57] ABSTRACT

An integral sink top and bowl structure and method of making the same are provided having an outer layer of rigid resin reinforced with fibers and an inner layer of substantially greater thickness of a foamed in situ resin fixed to said outer layer, said foamed resin having a density between about 5 to 20 lbs per cubic foot and a dense, hard skin on the exposed surfaces thereof.

7 Claims, 3 Drawing Figures

INVENTOR
Robert D. Schulz, Jr.

INTEGRAL TOPS AND BOWLS FOR SINKS AND THE LIKE AND METHODS OF MAKING THE SAME

This invention relates to integral tops and bowls for sinks and the like and methods of making the same and particularly to an integral top and bowl structure made of plastic foam and reinforced rigid plastic and particularly of urethane type foam in combination with glass fibers and rigid resin.

The manufacture of sink tops to which bowls are later attached is a practice which is quite old. These sink tops have been formed of laminates covered with an outer protective sheet of formica or the like plastic capable of resisting stains and ordinary household liquids. Integral sink tops and bowls have also been cast of various mixtures of aggregate and binder including marble chips in various siliceous cements and in a variety of dense plastic materials. None of these structures has been entirely satisfactory for a variety of reasons known to the trade. In the laminate structures there always exists the problem of forming a satisfactory seal between the top and bowl as well as the problems of skin damage and penetration which are inherent in the thin skin covering and warpage of the base. In the case of the integral cast tops and bowls of aggregate and binder, the structures are too heavy, too brittle, too easily damaged and could only be satisfactorily fabricated in small units.

The present invention eliminates these problems and makes possible the casting of integral tops and bowls in any size and shape desired. The present invention provides a structure which is relatively light in weight, very strong and resistant to damage and easily formed.

Preferably the invention provides an outer layer of fiber glass reinforced resin such as polyester, epoxy or the like and a backing layer of controlled thickness and density formed of a foamed polyol such as polyester or polyether with isocyanate, a blowing agent, surfactant and catalyst. Preferably the foamed backing is of a density in the range of about 2 to 20 lbs per cubic foot and particularly about 5 lbs per cubic foot and is formed in a closed mold to provide a hard impenetrable outside skin. Preferably the outer surface of fiber glass reinforced resin contains whatever color and design characteristics are desired.

In the foregoing general description certain objects, purposes and advantages of this invention are set out. Other objects, purposes and advantages will be apparent from a consideration of the following description and the accompanying drawings in which.

Figure 1:
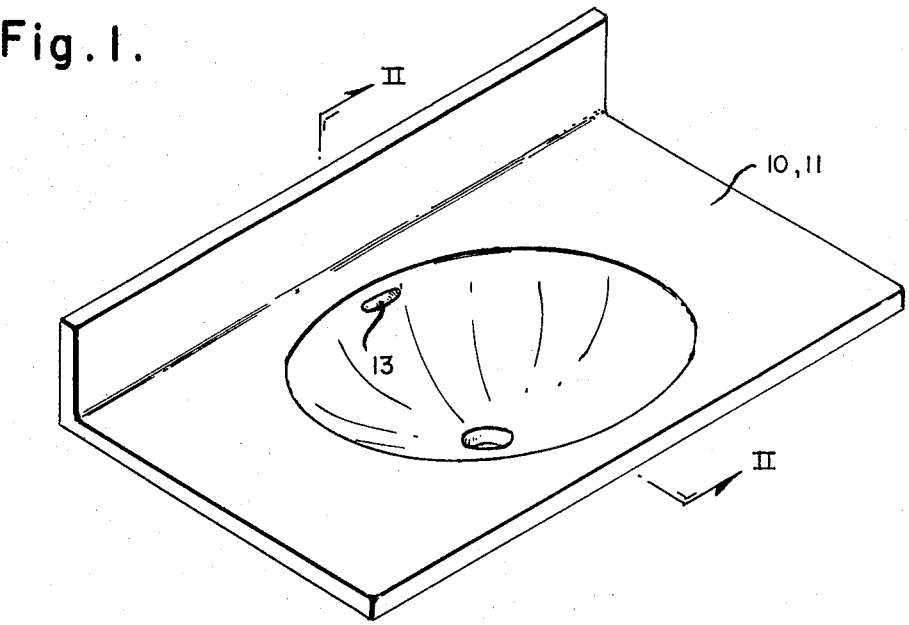
FIG. 1 is an isometric view of an integral sink top and bowl according to the present invention.
Figure 2:
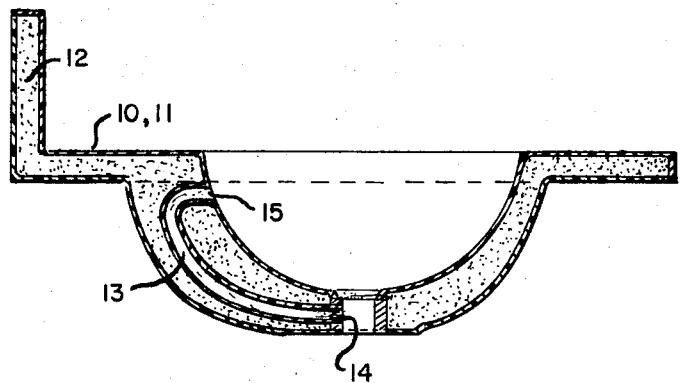
FIG. 2 is a section on the line II—II of FIG. 1.
Figure 3:
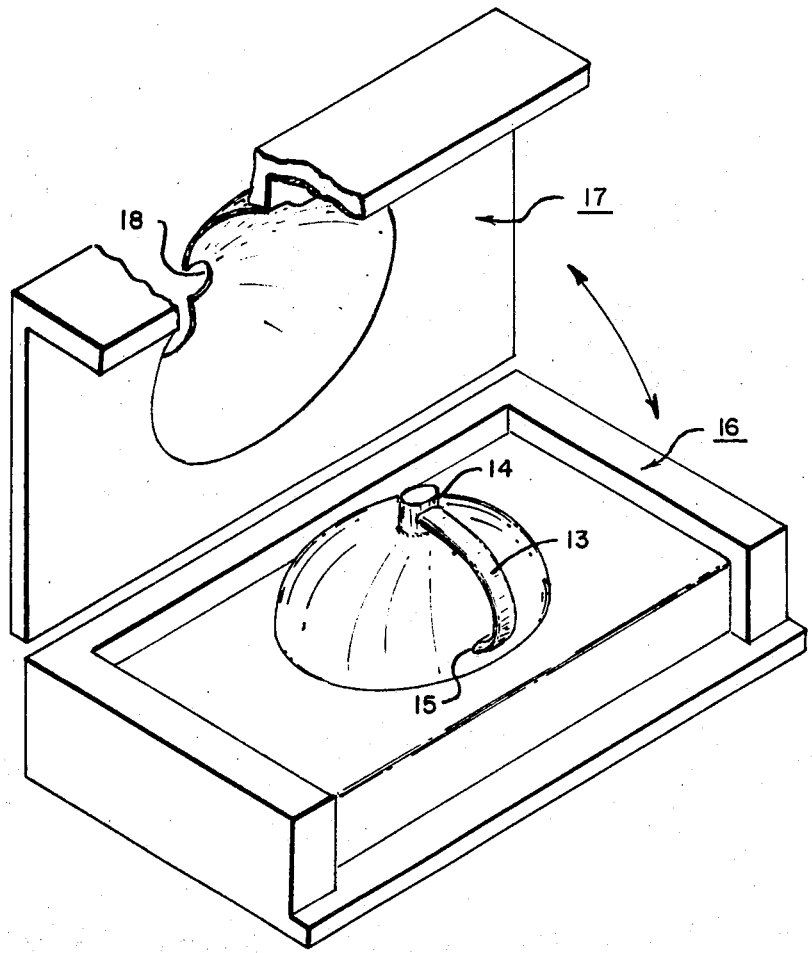
FIG. 3 is an exploded view of a mold for making sink tops and bowls according to this invention.

Referring to the drawings an integral sink bowl and top are provided having an outer layer, both top and bottom, formed of glass fibers 10 embedded in and reinforcing an outer surface of rigid resin such as polyester resin 11. The rigid resin 11 may be an epoxy resin or any other of the well-known rigid resins used in fiber glass resin molding systems. A back-up layer 12 of substantially greater thickness than the fiber glass-resin layer 10–11 is formed of foamed in situ urethane or similar plastic foam. The foam layer 12 may be made by reacting a polyol with isocyanate in the presence of a blowing agent such as Freon or water or a combination thereof together with the necessary catalyst and surfactant to produce a desired strength, density and surface condition. A typical foam composition may be based upon the combination described in Technical Bulletin — 101 of The Upjohn Company, Polymer Chemicals Division, Kalamazoo, Michigan at pages 5 and 6.

The sink top and bowl of this invention are preferably made by placing a preformed plastic overflow tube 13 having end connections 14 and 15 in place in a mold 16. An outer layer of fiber glass reinforced resin 11 is sprayed in place on both mold 16 and mold 17 using chopped fiber glass. This layer could be laid up by hand or otherwise applied to the mold but spraying is preferred. A mixture of polyol, isocyanate, surfactant and catalyst is poured into mold 16 on top of the resin layer 11 and covered with mold cover 17 and the resin layer therein. Alternatively the mixture could be poured into the mold through opening 18 in mold cover 17 and the opening closed. The polyol is permitted to foam in situ in the closed mold to form a rigid foamed layer 12 having a density of about 5 pounds per cubic foot which is firmly adhered by its inherent adhesiveness to the two glass-resin layers 10–11. The mold cover 17 is removed and the completed sink bowl and top removed from mold 16.

The sink top and bowl of this invention is highly resistant to stains and surface damage, is quite rigid, has great strength and is light in weight and easily handled. It is free of all of the defects which have been prevalent in this art.

While a preferred embodiment and practice of this invention have been described in the foregoing specification it will be understood that this invention may be otherwise embodied and practiced within the scope of the following claims.

I claim:

1. An integral sink top and bowl structure comprising an outer layer of rigid resin reinforced with fibers, and an inner layer of substantially greater thickness of a foamed in situ resin fixed by its inherent adhesiveness to said outer layer, said foamed resin having a density between about 2 to 20 lbs per cubic foot and a dense, hard skin on the exposed surfaces thereof.

2. An integral sink top and bowl structure as claimed in claim 1 wherein the outer layer is composed of fiber glass reinforced resin from the group consisting of polyester resin and epoxy resin.

3. An integral sink top and bowl structure as claimed in claim 1 wherein the foamed in situ resin is urethane.

4. An integral sink top and bowl structure as claimed in claim 2 where in the foamed in situ resin is formed of a polyol from the group polyester and polyether, an isocyanate, a surfactant and a catalyst.

5. An integral sink top and bowl structure as claimed in claim 1 having a preformed plastic tube formed therein as an overflow drain.

6. The method of forming an integral sink top and bowl comprising the steps of:
   a. applying a layer of rigid resin and fibers to the inner surfaces of a mold,
   b. closing said mold,
   c. foaming in said closed mold a composition capable of forming a foam of a density between about 2 and 20 lbs. per cubic foot with a high density non-porous skin and adhered to the resin, and
   d. setting said foam in said mold and thereafter removing the formed top and bowl.

7. The method of forming an integral sink top and bowl comprising the steps of:
   a. forming a top and bottom shell of fiberglass and resin,
   b. placing said top and bottom in spaced relation to form a hollow core,
   c. foaming a resin within said spaced top and bottom having a density in the range of 2 to 20 lbs per cubic foot.

* * * * *